(12) United States Patent
Ginosatis

(10) Patent No.: US 11,020,943 B2
(45) Date of Patent: Jun. 1, 2021

(54) MULTILAYER CLING FILM

(71) Applicant: Flexopack S.A., Koropi Attica (GR)

(72) Inventor: Dimitris Ginosatis, Koropi Attica (GR)

(73) Assignee: FLEXOPACK S A., Koropi (GR)

( * ) Notice: Subject to any disclaimer, the term of this patent is extended or adjusted under 35 U.S.C. 154(b) by 0 days.

(21) Appl. No.: 16/149,889

(22) Filed: Oct. 2, 2018

(65) Prior Publication Data
US 2019/0099988 A1  Apr. 4, 2019

(30) Foreign Application Priority Data

Oct. 2, 2017 (EP) .................... 17194425
Oct. 23, 2017 (EP) .................... 17197775

(51) Int. Cl.
*B32B 27/30* (2006.01)
*B32B 27/08* (2006.01)
*B32B 27/32* (2006.01)
*B32B 7/12* (2006.01)

(52) U.S. Cl.
CPC ............... *B32B 27/08* (2013.01); *B32B 7/12* (2013.01); *B32B 27/30* (2013.01); *B32B 27/306* (2013.01); *B32B 27/32* (2013.01); *B32B 2250/24* (2013.01); *B32B 2250/246* (2013.01); *B32B 2250/44* (2013.01); *B32B 2307/514* (2013.01); *B32B 2307/7242* (2013.01); *B32B 2307/7244* (2013.01); *B32B 2307/732* (2013.01); *B32B 2439/00* (2013.01); *B32B 2439/06* (2013.01); *B32B 2439/70* (2013.01)

(58) Field of Classification Search
CPC .......... B32B 2250/24; B32B 2250/246; B32B 2250/44; B32B 2307/514; B32B 2307/7242; B32B 2307/7244; B32B 2307/732; B32B 2439/00; B32B 2439/06; B32B 2439/70; B32B 27/08; B32B 27/30; B32B 27/306; B32B 27/32; B32B 7/12
See application file for complete search history.

(56) References Cited

U.S. PATENT DOCUMENTS

2002/0037386 A1* 3/2002 Bonke ................. B32B 27/32
                                                    428/40.1
2009/0208718 A1* 8/2009 Stoll .................... B32B 27/08
                                                    428/220

FOREIGN PATENT DOCUMENTS

| EP | 1457314 A1 | 9/2004 |
| EP | 2052857 A1 | 4/2009 |
| EP | 2626202 A1 | 8/2013 |
| EP | 3009263 A1 | 4/2016 |
| JP | H05294357 A | 11/1993 |
| WO | 2000037253 A1 | 6/2000 |
| WO | 2002009940 A2 | 2/2002 |
| WO | 2008031321 A1 | 7/2008 |
| WO | 2014202554 A1 | 12/2014 |

* cited by examiner

*Primary Examiner* — Lawrence D Ferguson
(74) *Attorney, Agent, or Firm* — Arent Fox LLP

(57) ABSTRACT

A kitchen wrap film comprising a barrier layer and an adhesive layer is disclosed where the thickness of the film is less than 25 microns.

8 Claims, No Drawings

MULTILAYER CLING FILM

In the plastic film area a very well known type of film is the so called "cling film" or "kitchen wrap". This film is used by the layman in order to protect ready food from spoilage in everyday kitchen use. Well known films of this type is Saranex film in the U.S. and similar films in Europe, Australia and Japan.

This kind of films in order to perform must combine a certain range of properties.
1. They must have enough adhesiveness in order to cling to plastic kitchen bowls (eg Tupperware type) so that the food stored is protected.
2. They must have enough elongation to be effectively used in practical everyday applications.
3. They must be able to unwind easily during everyday use in the kitchen (films are used in reel form wound around a paper or plastic core).
4. They must be able to be torn efficiently.
5. They must be environmentally friendly and as thin as practically possible.
6. It is desirable to have odour barrier properties.

In the today state of the art, two basic films are used for this application.

First one is based on LLDPE (linear low density polyethylene) while the second is based on PVDC (polyvinylidene chloride). Both have certain advantages and disadvantages.

LLDPE films are economical to manufacture, have enough cling properties and are environmentally friendly. But on the other hand they do not have odour barrier properties and they are notoriously known for being difficult to cut and difficult to unwind. This type of film is the most common in Europe.

PVDC films are very difficult to produce and are expensive and considered as non environmentally friendly (due to chlorine presence in PVDC). They have excellent odour barrier and acceptable cling properties.

The present application teaches the use of a film of thickness less than 25 microns as a kitchen wrap film. The film comprises at least two layers namely a barrier layer and an adhesive layer and is able to remedy the deficiencies of the films of the current state of the art.

FILM OF THE INVENTION

The film of the invention is of a thickness of less than 25 microns, preferably less than 20 microns, preferably less than 18 microns, preferably less than 15 microns.

The film of the invention is preferably of the structure
BARRIER LAYER/ADHESIVE LAYER
BARRIER LAYER/TIE LAYER/ADHESIVE LAYER
RELEASE LAYER/BARRIER LAYER/TIE LAYER/ADHESIVE LAYER
RELEASE LAYER/TIE LAYER/BARRIER LAYER/TIE LAYER/ADHESIVE LAYER
RELEASE LAYER/ABUSE LAYER/TIE LAYER/BARRIER LAYER/TIE LAYER/ABUSE LAYER/ADHESIVE LAYER Or any other structure that comprises the above basic structures.

In a most preferable version of the film the adhesive layer is the layer used as inner layer (=the film surface that is closest to the packed food).

Definitions

In this application the following definitions are used:

The term "film" refers to a flat or tubular flexible structure of thermoplastic material.

The term "heat shrinkable" refers to a film that shrinks at least 10% in at least one of the longitudinal and transverse directions when heated at 90° C. for 4 seconds. The shrinkability is measured in water according to ASTM 2732. For temperatures like 100° C. or more, glycerine is used as a reference liquid.

The term "total heat shrinkability" refers to the sum of heat shrinkability at the MD direction and heat shrinkability at the TD direction. In all cases, ASTM 2732 is used for measurement of shrinkabilities.

The term "multilayer" refers to a film comprising 2 or more layers.

The phrase "longitudinal direction" or "machine direction" herein abbreviated "MD" refers to a direction along the length of the film.

The phrase "outer layer" refers to the film layer which comes in immediate contact with the outside environment (atmosphere).

The phrase "inner layer" refers to the film layer that comes in direct contact with the product packed.

As used herein, the term "homopolymer" refers to a polymer resulting from polymerization of a single monomer.

As used herein, the term "copolymer" refers to a polymer resulting from polymerization of at least two different polymers.

As used herein, the term "polymer" includes both above types.

As used herein, the term "polyolefin" refers to any polymerized olefin, which can be linear, branched, cyclic, aliphatic, substituted or unsubstituted. More specifically, included in the term polyolefin are homopolymers of olefin, copolymers of olefin, copolymers of an olefin and a non olefinic comonomer (such as ester) etc.

Specific examples include polyethylene homopolymer, polypropylene homopolymer, polybutene homopolymer, ethylene alpha olefin copolymer, propylene alpha olefin copolymer, butene alpha olefin copolymer, ionomer, ethylene ester copolymer etc.

As used herein the term "polyethylene" identifies polymers consisting essentially of the ethylene repeating unit. The ones that have a density more than 0.940 are called high density polyethylene (HDPE), the ones that are have less than 0.940 are low density polyethylene (LDPE).

As used herein the phrase "ethylene alpha olefin copolymer" refers to polymers like linear low density polyethylene (LLDPE), medium density polyethylene (MDPE), very low density polyethylene (VLDPE), ultra low density polyethylene (ULDPE), metallocene catalysed polymers and polyethylene plastomers and elastomers.

As used herein the term "homogeneous ethylene alpha olefin copolymers" refer to ethylene alpha olefin copolymers having a molecular weight distribution less than 2.7 as measured by GPC. Typical examples of these polymers are AFFINITY from DOW or Exact from Exxon.

As used herein the phrase "styrene polymers" refers to styrene homopolymer such as polystyrene and to styrene copolymers such as styrene-butadiene copolymers, styrene-butadiene-styrene copolymers, styrene-isoprene-styrene copolymers, styrene-ethylene-butadiene-styrene copolymers, ethylene-styrene copolymers and the like.

As used herein the phrase "ethylene methacrylate copolymers" refers to copolymers of ethylene and methacrylate monomer. The monomer content is less than 40% per mol.

As used herein the phrase "ethylene vinyl acetate copolymer" or EVA refer to copolymers of ethylene and vinyl acetate.

As used herein the phrase "ethylene ester copolymer" includes any polymer made from ethylene and ester monomers. It is obvious that this term includes EVAs, EMAs and other polymers.

As used herein the term "oxygen barrier polymer" refers to polymers which have the property to limit the passage of oxygen through a film or a layer comprising the polymer. Common materials are EVOH, PVDC or polyamide.

As used herein, the term EVOH refers to saponified products of ethylene vinyl ester copolymers. The ethylene content is typically in the range of 25 to 50% per mol. All the later references to EVOH ethylene content will be in % per mol.

As used herein the term PVDC refers to a vinylidene chloride copolymer wherein a major amount of the copolymer comprises vinylidene chloride and a minor amount of the copolymer comprises one or more monomers such as vinyl chloride and/or alkyl acrylates and methacrylates.

As used herein the term "polyamide" refers to homopolymers and copolymers. Polyamide 6, polyamide 66, polyamide 12, polyamide 6/66, polyamide 6/12, polyamide elastomers, MXD polyamides and other copolymers are specifically useful for the invention.

As used herein the term "polyester" refers to polymers comprising terephthalate units. Examples of polyesters are PET (polyethylene terephthalate), PBT (polybutylene terephthalate), polyester elastomer (block copolymer comprising ester or ether units), PTT and other similar polymers.

As used herein, the term "ionomer" comprises the copolymers of ethylene and methacrylic or acrylic acid being metal neutralized. An example of such material is Surlyn from Dupont.

As used herein, the term "polypropylene" refers to polymers incorporating propylene structural units. Examples of these, are homo polypropylenes, random copolymers of propylene and ethylene, block copolymers of propylene and ethylene, copolymers or blends of propylene and rubber (such as blends of polypropylene and ethylene propylene rubber), propylene ethylene alpha olefin terpolymers and others.

These polymers may be isotactic, syndiotactic or atactic. Isotactic configuration is preferred.

As used herein the term "self adhesive material" refers to materials that when produced into film form can be bonded to themselves by pressure only without the need to be heated. The bonding level which separates self adhesive from non self adhesive materials is 5 g/15 mm when the bonding has been done on a 100×1500 mm film piece with a pressure of 3 bar under ambient conditions and with a contact time of 5 seconds. Values of more than 5 g/15 mm according to this test show that the material is self adhesive whereas values of lower than 5 g/15 mm show the film being non self adhesive.

As used herein the term "substantially non resilient material" refers to materials or material compounds comprising at least 40% per weight inorganics like calcium carbonate, titanium dioxide, wollastonite, mica, glass fibers, dolomite and the like. The rest percentage per weight can be polyethylene, polypropylene, styrene polymer or other thermoplastic material.

As used herein the term "tackifier" refers to low molecular weight materials used to increase the stickiness of the surface of an adhesive. Typical examples are rosins and their derivatives, terpenes and modified terpenes, hydrogenated hydrocarbon resins, C5 aliptatic resins, C9 aromatic resins, C5/C9 resins, terpene/phenol resins and the like.

All measurement methods mentioned herein are readily available for the skilled person. For example, they can be obtained from the American National Standards Institute at: www.webstore.ansi.org.

All percentages are based on weight per weight ratio, except when otherwise stated.

The grs/square meter is same as $g/m^2$. Both are expressing the weight to surface ratio.

Detailed Description of Layers:

Barrier Layer

In a preferred embodiment of the invention, the oxygen barrier material is EVOH.

The EVOH used preferably has an ethylene content less than 48%, more preferably less than 44%, more preferably less than 38%, more preferably from 27 to 32% ethylene per mol.

In another preferred embodiment, the oxygen barrier material comprises polyamide.

The oxygen barrier material preferably has a weight of less than 3 $g/m^2$, more preferably less than 2 $g/m^2$ and even more preferably less than 1.5 $g/m^2$.

Inner Layer (Adhesive)

The inner layer comprises an adhesive material.

In a further preferred embodiment, the weight of the inner layer is less than 6 $g/m^2$, more preferably less than 5 $g/m^2$.

In a preferred version, the adhesive material comprises ethylene vinyl acetate copolymer where the vinyl acetate weight ratio is at least 20%, more preferably at least 25% even more preferably at least 25%, even more preferably at least 40%.

In another preferred version, the adhesive material is a propylene ethylene copolymer where the ethylene content is at least 10% per weight.

In another preferred version the adhesive material comprises an ethylene alpha olefin copolymer with density less than 0.9 $g/cm^3$, even more preferably less than 0.880 $g/m^3$. Preferred alpha olefins are butene, hexene or octene.

In another preferred version, the adhesive material comprises a maleic anhydrite grafted polyolefin. Examples are maleic anhydrite grafted ethylene vinyl acetate copolymer of linear low density polyethylene.

In another preferred version, the adhesive material comprises styrene copolymers with styrene content less than 50% per weight. Typical examples are styrene butadiene styrene copolymers, styrene isoprene styrene copolymers, styrene ethylene butadiene copolymers and the like.

In another preferred version, the adhesive material comprises ethylene methyl acrylate copolymer with a methyl acrylate content of at least 20%.

In another preferred version, the self adhesive material comprises ethylene butyl acrylate material with a butyl acrylate content of at least 15%.

In another preferred version, the adhesive material comprises poly-isobutylene polymer (PIB) or polybutene copolymer.

The inner layer may comprise also non self adhesive materials such as polyolefins (preferably polyethylene homopolymers of copolymers) but not to the extent that the adhesive properties are compromised.

In another version, the inner layer may comprise tackifiers such as hydrocarbon resins, terpene resins, rosins and the like. Typical examples are Escorez materials from Exxon.

In a further preferred version the inner layer may comprise materials such as "substantially non resilient materials" (SNR). See the above definition of this term.

In a preferred version of the invention, the adhesive material in the inner layer is an extrudable material, meaning that it is melt processed by extrusion process.

Outer Layer (Release Layer)

As defined above, the phrase "outer layer" refers to the film layer that comes in direct contact with the environment.

Preferred materials for the outer layer include polyolefins, such as low density polyethylene, high density polyethylene, ethylene ester copolymer, ethylene alpha olefin copolymer and polypropylene. Ionomers and styrene copolymers are also possible. Ethylene alpha olefin copolymer is particularly preferred.

According to a further embodiment, the present invention is of the same configuration where outer layer comprises a "substantially non resilient material" (SNR).

In a preferred version of the invention, the SNR material is at least 10 percent, preferably at least 20, preferably at least 30 percent per weight of the outer layer.

In a preferred version the outer layer comprises at least one release agent that is a polymer or chemical substance that allows the surface tension of the outer side to decrease. The reason for this is to allow the easy unwinding of the reel when the inner and the outer side come in contact one to the other. Preferred release agents are organic lubricants (such as erucamide or oleamide) and silicone or siloxane based lubricants.

Tie Layers

In the tie layers typical adhesive resins like maleic anhydride modified polyolefins may be used. Typical examples are BYNEL® from Dupont and OREVAC® from Arkema.

In another preferred version of the invention, polyamide could be used as tie layer.

In that case a tie layer is needed between polyamide and polyolefins.

Abuse Layers

In the abuse layers the use of polyolefin homopolymers and/or copolymers is preferred. Polyamide, polystyrene and polyester is also possible.

General

The preferred production method for the film is the hot blown film method, which is well known in the art. Other methods like extrusion through flat cast die are also possible.

Additives well known in the art may be used in one or more layers of the present invention. Slip additives, antiblock additives, antifog, polymer processing aids may be used if pertinent.

In order to increase the mechanical properties the film may be crosslinked with one of the following methods.

E-beam radiation, gamma radiation, moisture crosslinking using silane grafting compounds, peroxide crosslinking.

The film may be in tubular form or sealed at the edges or single sheet configuration. Centerfold configuration is also possible.

EXAMPLES

Example 1

A 5 layer film is produced in a commercial hot blown film line with the following recipe:
Outer layer, 80% EAO1+15% SNR1+5% ADDITIVES
Tie layer 100% ADH 1
Barrier layer EVOH 1
Tie layer 100% ADH1
Inner layer, Ethylene vinyl acetate copolymer comprising 80% vinyl acetate per weight (=a blend of EVA with 90% vinyl acetate+10% low density polyethylene)
See table 1
The thickness of the structure is 5/1.5/1.5/1.5/3 starting from the inner and going to the outer layer.

TABLE 1

| Type | Description | Density g/cm³ |
| --- | --- | --- |
| EAO1 | Ethylene octene copolymer (LLDPE) | 0.92 |
| SNR1 | Calcium carbonate compound | 1.6 |
| ADH1 | LLDPE mod. Adhesive tie | 0.92 |
| EVOH 1 | EVOH with 32% ethylene | 1.19 |

Example 2

A 5 layer film is produced in a commercial hot blown film line with the following recipe
Outer layer 80% EAO1+15% SNR1+5% ADDITIVES
Tie layer 100% ADH 1
Barrier layer EVOH 1
Tie layer 100% ADH1
Inner layer A blend of 90% ethylene vinyl acetate copolymer comprising 80% vinyl acetate per weight+10% calcium carbonate polyethylene compound (SNR).
Thickness of the structure is 4/1.5/1.3/1.5/3

Testing the Material as Kitchen Wrap

The materials of ex. 1 and 2 were tested against an LLDPE film sold as kitchen wrap film in a supermarket (prior art film). Tests comprised
easy to tear
odour
easy to unwind 1. Tear Test All three materials were tested as per manual tearing along the TD (transverse direction) as a simulation of the usage of the film by a "housewife". It was evident that both films of example 1 and 2 were much easier to tear manually versus the prior art film. This is of importance in the application, as it can eliminate the different cutting equipment used in the kitchen for the state of the art films (eg special mini guillotines etc).

2. Odour Test

Traditional white cheese was packed in all three films, then packed individually in a PVDC comprising bag and put into refrigerator. After 3 days the PVDC comprising bags were removed and evaluated by a panel of 5 persons (each giving a 3 of the most smelly pack versus a 1 of the less smelly).

The prior art film had a 14 while film 1 had a total sum of 7 and film 2 of 9.

So the films of the invention are superior versus the state of the art film.

3. Easy to Unwind.

Films of examples 1 and 2 were slitted to 300 mm width and evaluated how easy they would unwind from the core.

It was again evident that the unwinding of the films of the examples 1, 2 were much easier than the state of the art film.

The invention claimed is:

1. A film with thickness of less than 25 microns and comprising a barrier layer, an inner adhesive layer, an outer release layer and at least one tie layer between the adhesive and barrier layer, wherein at least one of the outer release layer and the inner adhesive layer comprises at least 10% per weight of a substantially non resilient (SNR) material.

2. The film of claim 1 where the film thickness is less than 20 microns.

3. The film of claim 1, where the film thickness is less than 18 microns.

4. The film of claim 1, where the barrier layer comprises EVOH.

5. The film of claim 1, where the adhesive layer comprises ethylene vinyl acetate copolymer.

6. The film of claim 1, where the release layer comprises polyolefin homopolymer or copolymer.

7. The film according to claim 1 adapted for use as a as a kitchen wrap, wherein the inner adhesive layer directly contacts a wrapped product and the outer release layer is in immediate contact with outside atmosphere.

8. The film according to claim 1, wherein the substantially non resilient material comprises at least 40% per weight calcium carbonate, titanium dioxide, wollastonite, mica, glass fibers, or dolomite.

* * * * *